(12) United States Patent
Kishi et al.

(10) Patent No.: US 7,675,559 B2
(45) Date of Patent: Mar. 9, 2010

(54) IMAGE SENSING APPARATUS HAVING A TWO STEP TRANSFER OPERATION AND METHOD OF CONTROLLING SAME

(75) Inventors: Takafumi Kishi, Kanagawa (JP); Nobuhiro Takeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1166 days.

(21) Appl. No.: 11/010,170

(22) Filed: Dec. 10, 2004

(65) Prior Publication Data

US 2005/0128324 A1 Jun. 16, 2005

(30) Foreign Application Priority Data

Dec. 12, 2003 (JP) ............................. 2003-415481

(51) Int. Cl.
*H04N 5/335* (2006.01)
*H04N 3/14* (2006.01)

(52) U.S. Cl. .................. 348/294; 348/281; 348/304

(58) Field of Classification Search ................. 348/281, 348/294, 297, 302–304
See application file for complete search history.

(56) References Cited

U.S. PATENT DOCUMENTS

| | | | | |
|---|---|---|---|---|
| 5,398,063 | A * | 3/1995 | Yamana ........................ | 348/345 |
| 6,963,372 | B1 * | 11/2005 | Hiyama et al. ............... | 348/302 |
| 7,053,949 | B2 * | 5/2006 | Hwang ......................... | 348/312 |
| 7,064,788 | B2 * | 6/2006 | Yoshida et al. .............. | 348/296 |
| 2003/0206235 | A1 * | 11/2003 | Suzuki ......................... | 348/304 |
| 2005/0040318 | A1 * | 2/2005 | Ooshima et al. ............ | 250/208.1 |
| 2005/0110884 | A1 * | 5/2005 | Altice et al. ................. | 348/302 |

FOREIGN PATENT DOCUMENTS

| | | |
|---|---|---|
| JP | 2000-260971 | 10/2000 |
| JP | 2003-17677 | 1/2003 |

* cited by examiner

*Primary Examiner*—Sinh Tran
*Assistant Examiner*—Hung H Lam
(74) *Attorney, Agent, or Firm*—Cowan, Liebowitz & Latman, P.C.

(57) ABSTRACT

Disclosed is an image sensing apparatus comprising a plurality of two-dimensionally arrayed pixels each having a photodiode and a floating diffusion area for temporarily storing a charge signal that has accumulated in the photodiode; an output unit that outputs the charge signal, which has been transferred to the floating diffusion area, successively pixel by pixel; a scanning unit having a reset mode for resetting the photodiodes and floating diffusion areas successively by prescribed unit, a first transfer mode for transferring the charge signal, which has accumulated in the photodiodes, to the floating diffusion areas successively by the prescribed unit at prescribed time intervals upon lapse of a prescribed period of time from start of reset, and a second transfer mode for transferring the charge signal, which has been transferred to the floating diffusion areas, to the output unit. Before operation of the second transfer mode is performed with respect to a plurality of the prescribed units, the scanning unit transfers the charge signal, which has accumulated in the photodiodes, to the floating diffusion areas successively by the prescribed unit at the prescribed time intervals with respect to the plurality of prescribed units.

10 Claims, 8 Drawing Sheets

IMAGE SENSING APPARATUS HAVING A TWO STEP TRANSFER OPERATION AND METHOD OF CONTROLLING SAME

FIELD OF THE INVENTION

This invention relates to an image sensing apparatus that employs a solid-state image sensing device, and to a method of driving this apparatus. More particularly, the invention relates to the structure of an image sensing apparatus for implementing a high-speed shutter operation in accurate fashion, and to a method of driving this apparatus.

BACKGROUND OF THE INVENTION

In an image sensing apparatus that employs a solid-state image sensing device such as a CCD or CMOS, the exposure time of the image sensing device is controlled using a mechanical shutter, which is a mechanical light-shield member. To realize a short exposure time, it is necessary to drive the shutter at high speed. This requires mechanical precision and involves difficult control at the same time. Although optical-plane shutters of improved control precision are used in some image sensing apparatus, these are high in cost because they require a complicated mechanism and high precision. Thus, since there are limitations upon exposure-time control with mechanical shutters, electronic-shutter operation is essential in order to realize shutters of higher speed.

An example of an electronic shutter that employs an image sensing device employing an XY-address-type scanning method according to the prior art will now be described.

An electronic shutter operation can be achieved by first executing reset scanning, namely by eliminating unnecessary electric charge, which has accumulated in the pixels of the device, on a per-pixel or per-line basis, and then reading out signal charge upon elapse of a prescribed period of time pixel by pixel or line by line. Such an electronic shutter is referred to as a "rolling electronic shutter".

The structure of a conventional image sensing device and the operation of a rolling electronic shutter will be described with reference to FIGS. 6 and 7.

FIG. 6 illustrates the structure of an image sensing device that employs an XY-address-type scanning method. The image sensing device includes unit pixels 101. In order to simplify the drawing of FIG. 6, only a 4×4 array of the unit pixels 101 is illustrated. In actuality, however, a very large number of such unit pixels are arrayed in two dimensions. Each unit pixel 101 includes a photodiode 102 for converting light to electric charge; a floating diffusion area 104 that temporarily stores electric charge; a transfer switch 103 for transferring electric charge, which has been produced by the photodiode 102, to the floating diffusion area 104 by a transfer pulse φTX; a MOS amplifier 105 that functions as a source follower; a selection switch 106 for selecting the pixel in response to a selection pulse φSEL; and a reset switch 107 for eliminating electric charge, which has accumulated in the floating diffusion area 104, in response to a reset pulse φRES. A floating depletion amplifier is constructed by the floating diffusion area 104, MOS amplifier 105 and a constant-current source 109, which is described later. Signal charge in the pixel selected by the selection switch 106 is converted to voltage and the voltage is output to a read-out circuit 113 via a signal output line 108. The constant-current source 109 has the MOS amplifier 105 as its load. A selection switch 110, which is for selecting an output signal from the read-out circuit 113, is driven by a horizontal scanning circuit 114. An output amplifier 111 is for outputting a signal to the outside of the image sensing device. A vertical scanning circuit 112 is for selecting the switches 103, 106 and 107.

Pulse signals applied to, e.g., an nth scanning line scanned and selected by the vertical scanning circuit 112 are denoted φTXn, φRESn and φSELn with regard to the pulse signals φTX, φRES and φSEL, respectively.

FIG. 7 illustrates driving pulses and the operating sequence relating to the operation of the rolling electronic shutter. In order to simplify the description regarding FIG. 7, the description rendered below will relate to control for driving four lines, namely line n to line n+3, scanned and selected by the vertical scanning circuit 112.

First, from time t31 to time t32 in regard to line n, a reset operation is performed by applying the pulse signals φRESn and φTXn, thereby turning on the transfer switches 103 and reset switches 107 to eliminate unnecessary electric charge that has accumulated in the photodiodes 102 and floating diffusion areas 104 of the nth line. A charge accumulating operation, in which the transfer switches 103 are turned off and photoelectric charge produced by the photodiodes 102 is accumulated, starts at time t32. Next, at time t34, a transfer operation is performed by applying the pulse φTXn, thereby turning on the transfer switches 103 to transfer photoelectric charge, which has accumulated in the photodiodes 102, to the floating diffusion areas 104. It should be noted that it is necessary to turn off the reset switches 107 in advance of the transfer operation. In control of drive illustrated in FIG. 7, the reset switches 107 are turned off at the same time as the transfer switches 103 are turned off at time t32. Accordingly, charge accumulation time is from time t32, at which the reset operation ends, to time t35, at which transfer ends.

By applying the pulse φSEL to turn on the selection switches 106 following the end of the transfer operation for the nth line, electric charge held in the floating diffusion areas 104 is converted to voltage and the voltage is output to the read-out circuit 113. Signals held temporarily by the read-out circuit 113 are output successively by the horizontal scanning circuit 114 at time t36. Let T3read represent the period of time from the start of transfer at time t34 to the end of read-out at time t37, and let T3wait represent the period of time from t31 to t33. Similarly, with regard to other lines, T3read is the period of time from the start of transfer to the end of read-out, and T3wait is the period of time from start of reset of a certain line to the start of reset of the next line.

There is a MOS-type image sensing device that performs a batch electronic shutter operation, in which the reset operations are performed all at once and the read-out operations are performed all at once. This operating sequence is illustrated in FIG. 8.

As shown in FIG. 8, reset operations for all lines are executed simultaneously from time t41 to time t42, and transfer operations are carried out simultaneously from time t43 to time t44. Such an electronic shutter is referred to as a "batch electronic shutter". When a batch electronic shutter is implemented, the accumulation time period is t42 to t44 for all lines, and the accumulation timings can be made the same from the top to the bottom of the screen (for example, see the specification of Japanese Patent Application Laid-Open No. 2003-17677).

A problem with the operation of the rolling electronic shutter of the prior art described above is that the accumulation timings at the top and bottom of the screen differ by the length of time necessary for scanning of the screen. This is because T3wait, which is the length of time from reset and transfer scan of a certain line to reset and transfer scan of the next line, is required to be greater than the time period T3read from start of transfer to end of read-out. The reason for this is that if T3wait is shorter than T3read, the image signal of the next line is output to the read-out circuit before the read-out operation of the present line is completed, as a result of which accurate image information cannot be obtained. Accordingly, read-out and scanning of image signals cannot be performed at high speed and a large disparity develops between the accumulation timings at the top and bottom of the screen, especially in a case where the screen is composed of a large number of pixels.

In the conventional batch electronic shutter operation described above, the reset and transfer operations are such that selection is performed collectively, and the read-out operation is such that scanning is performed line by line. This means that a circuit for implementing a batch selection operation is required anew. This invites a rise in cost, which accompanies an increase in the surface area of the semiconductor chip.

In a case where a still picture is taken using an electronic shutter, often the accumulation of charge is started after each pixel is cleared by the electronic shutter, and light is blocked by a mechanical shutter upon elapse of a prescribed period of time, thereby terminating charge accumulation, which is followed by read-out, as described above. The reason for this is that in a case where the CCD used as the image sensing device is a frame-transfer CCD or an interline two-field readout CCD, it is necessary that read-out of electric charge be performed in a state in which light is blocked. Further, even in the case of other CCDs, it is necessary to perform read-out upon blocking light to the CCD in order to achieve an improvement in image quality by positively preventing smear (a phenomenon in which electric charge that has overflowed from CCD pixels flows into the transfer portion and light appears so as to produce streaks along the vertical direction of the screen).

Further, if use is made of a MOS-type image sensing device, photoelectric charge will be produced in the floating diffusion area in a case where the image sensing device has such a structure that light leaks into the floating diffusion area. This means that the light must be blocked by a mechanical shutter after the transfer of charge to the floating diffusion area. With a mechanical shutter such as a focal-plane shutter and a batch electronic shutter, shutter scanning time of the batch electronic shutter, which decides the start of exposure, differs from the shutter scanning time of the mechanical shutter, which decides the end of exposure. As a consequence, exposure unevenness develops in the scanning direction of the mechanical shutter and this results in a decline in image quality.

SUMMARY OF THE INVENTION

The present invention has been made in view of the circumstances described above and its object is to achieve high-speed electronic shutter control in which image degradation ascribable to the time needed for read-out scan is reduced without the addition of new circuitry.

Another object of the present invention is to achieve electronic shutter control that is free of exposure unevenness caused when joint use is made of a mechanical shutter.

According to the present invention, the foregoing object is attained by providing a method of driving an image sensing apparatus that includes a plurality of two-dimensionally arrayed pixels each having a light-receiving portion for generating and accumulating electric charge in accordance with amount of incident light and a storage portion for temporarily storing a charge signal that has accumulated in the light-receiving portion, a scanning unit that scans the charge signal of the storage portions successively by prescribed unit comprising a row or column at least of the plurality of pixels, and an output unit that outputs the charge signal, which has been scanned by the scanning unit, successively pixel by pixel, the method comprising: a reset step of resetting the light-receiving portions and storage portions successively by the prescribed unit; a first transfer step of transferring the charge signal, which has accumulated in the light-receiving portions, to the storage portions successively by the prescribed unit at prescribed time intervals upon lapse of a prescribed period of time from start of the reset step; and a second transfer step of transferring the charge signal, which has been transferred to the storage portions, to the output means successively by the prescribed unit, and outputting the transferred charge signal to the outside pixel by pixel, wherein before operation of the second transfer step is performed with respect to a plurality of the prescribed units, the first transfer step transfers the charge signal, which has accumulated in the light-receiving portions, to the storage portions successively by the prescribed unit at the prescribed time intervals with respect to the plurality of prescribed units.

Further, according to the present invention, the foregoing object is attained by providing an image sensing apparatus comprising: a plurality of two-dimensionally arrayed pixels each having a light-receiving portion for generating and accumulating electric charge in accordance with amount of incident light and a storage portion for temporarily storing a charge signal that has accumulated in the light-receiving portion; an output unit that outputs the charge signal, which has been transferred to the storage portion, successively pixel by pixel; and a scanning unit which operates in a reset mode for resetting the light-receiving portions and storage portions successively by prescribed unit comprising a row or column at least of the plurality of pixels, a first transfer mode for transferring the charge signal, which has accumulated in the light-receiving portions, to the storage portions successively by the prescribed unit at prescribed time intervals upon lapse of a prescribed period of time from start of reset, and a second transfer mode for transferring the charge signal, which has been transferred to the storage portions, to the output unit successively by the predetermined unit, wherein before operation of the second transfer mode is performed with respect to a plurality of the prescribed units, the scanning unit transfers the charge signal, which has accumulated in the light-receiving portions, to the storage portions successively by the prescribed unit at the prescribed time intervals with respect to the plurality of prescribed units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail in accordance with the accompanying drawings.

Figure 6:
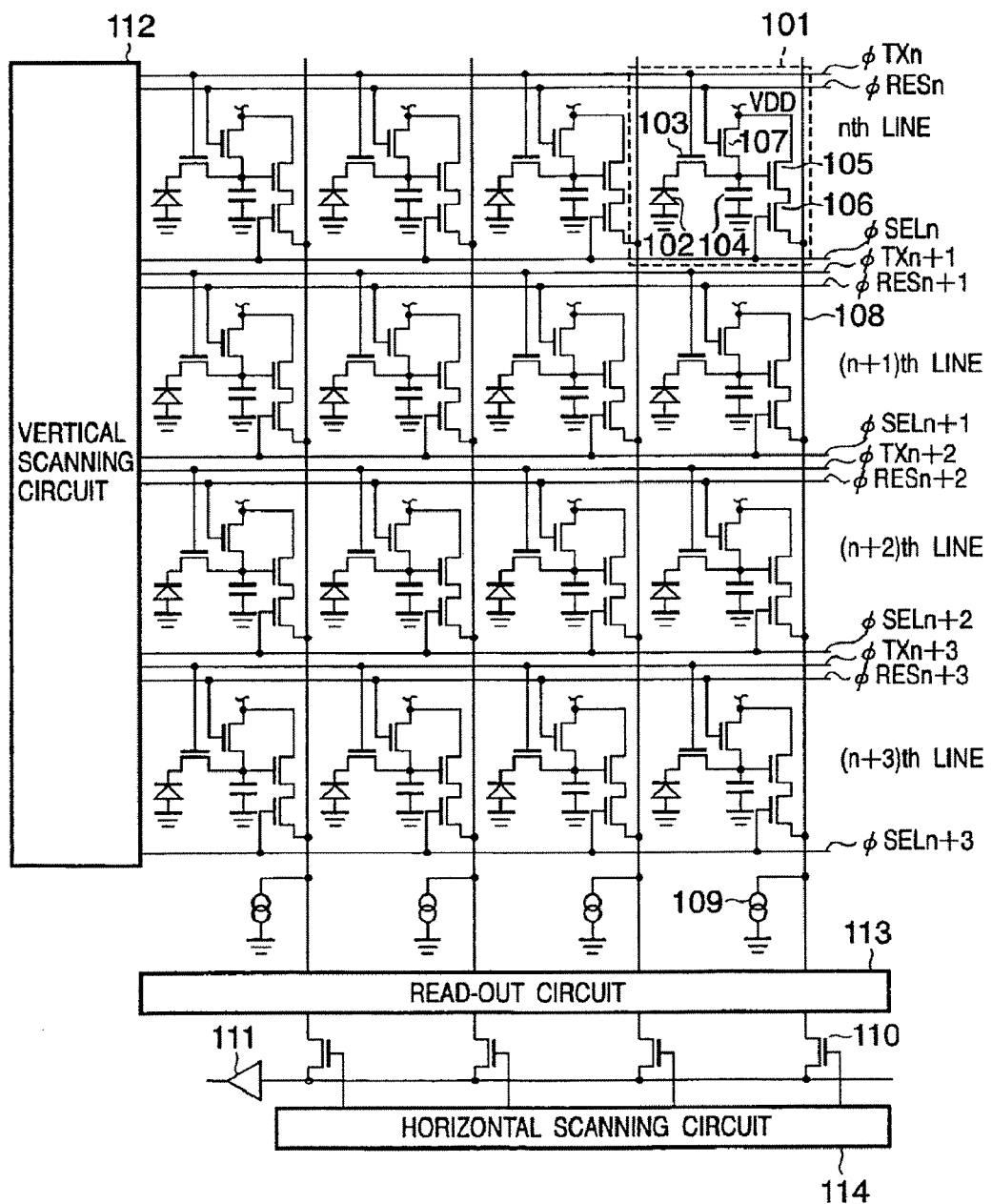
FIG. 6 is a circuit diagram illustrating the structure of an image sensing device.
Figure 7:
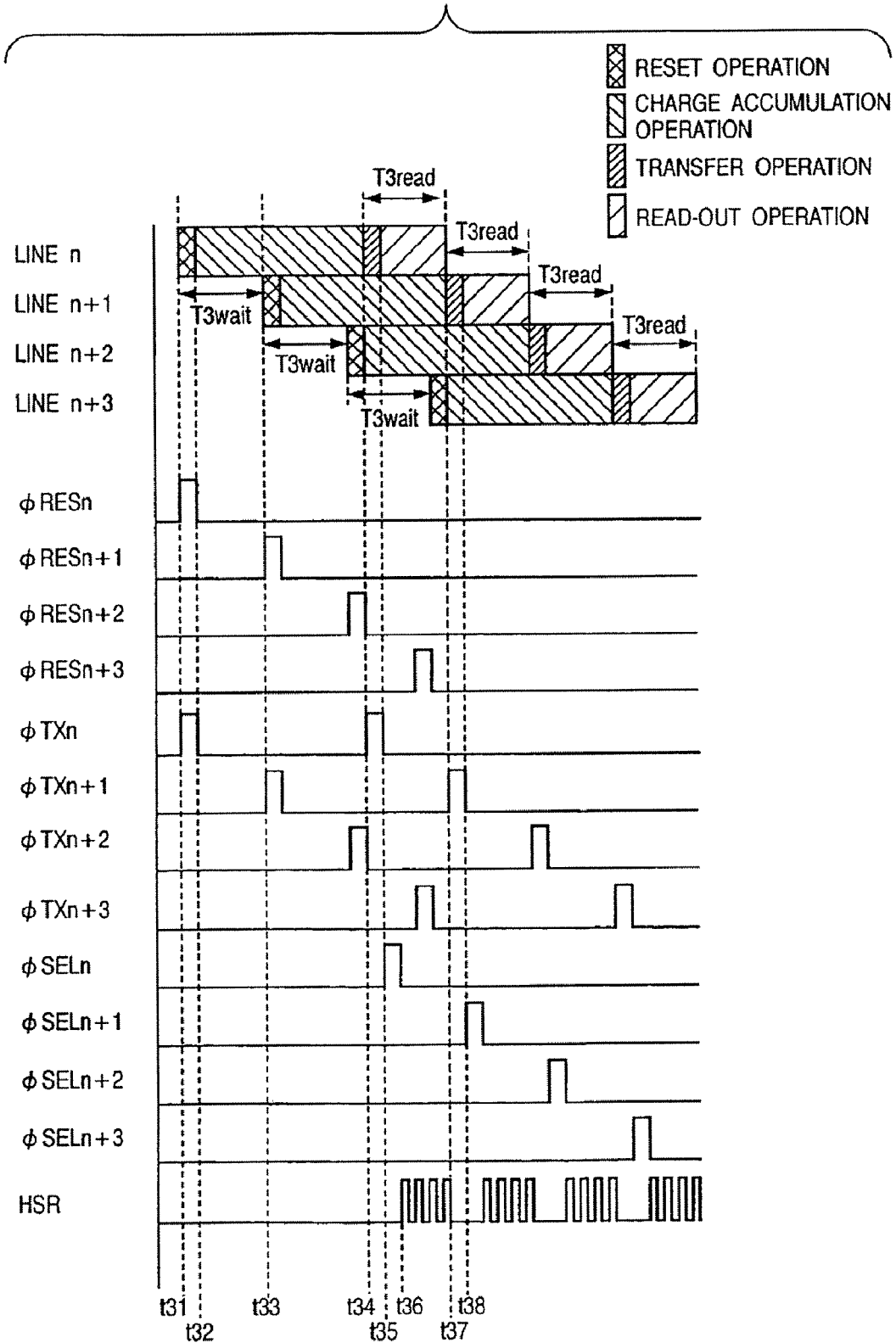
FIG. 7 is a timing chart illustrating an example of a driving method according to the prior art.
Figure 8:
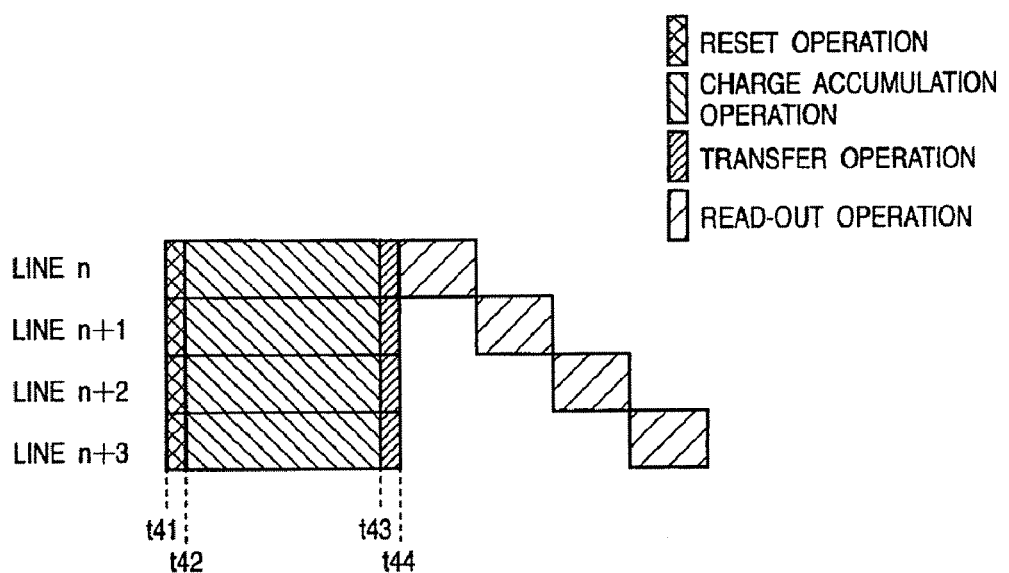
FIG. 8 is a timing chart illustrating another example of a driving method according to the prior art.

Since an image sensing device having a structure similar to that of the prior art shown in FIG. 6 is used in this embodiment, the device need not be described again here. In this embodiment, however, the method of controlling drive of the image sensing device (the operation of the vertical scanning circuit 112 in FIG. 6) differs from that of the prior art and therefore the method of controlling drive will be described in detail.

Figure 1:
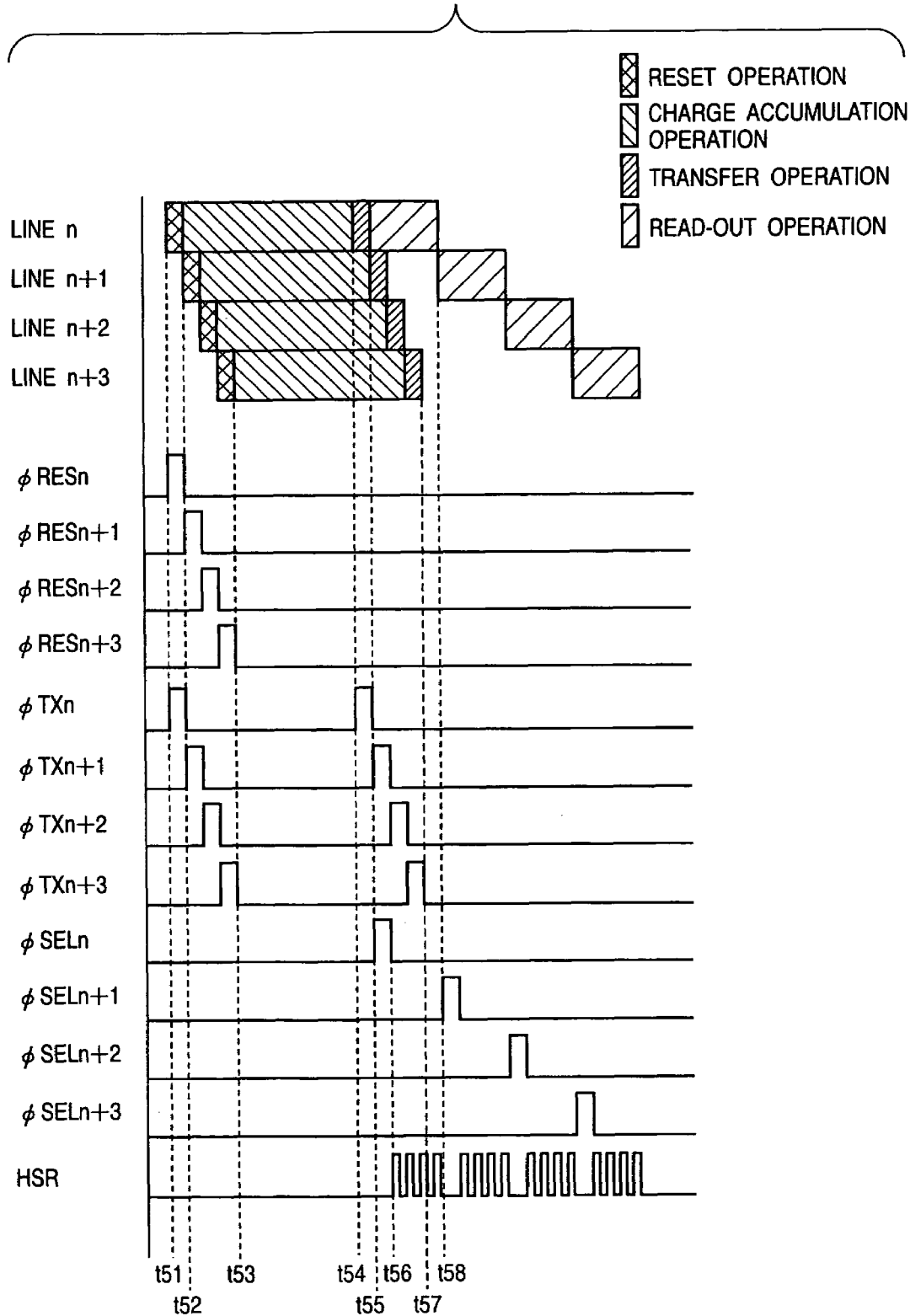
FIG. 1 is a timing chart illustrating a driving method according to an embodiment of the present invention.

FIG. 1 is a timing chart useful in describing the driving method and operating sequence of the image sensing device shown in FIG. 6 in an embodiment of the present invention. In order to simplify the description regarding FIG. 1, the description rendered below will relate to control for driving line n to line n+3 scanned and selected by the vertical scanning circuit 112. First, from time t51 to time t52 in regard to line n, a reset operation is performed by applying the pulse signals φRESn and φTXn, thereby turning on the transfer switches 103 and reset switches 107 to eliminate unnecessary electric charge that has accumulated in the photodiodes 102 and floating diffusion areas 104 of the nth line. A charge accumulating operation, in which the transfer switches 103 are turned off and photoelectric charge produced by the photodiodes 102 is accumulated, starts at time t52. Next, at time t54, a transfer operation is performed by applying the pulse φTXn, thereby turning on the transfer switches 103 to transfer photoelectric charge, which has accumulated in the photodiodes 102, to the floating diffusion areas 104. The transfer operation ends at time t55, at which the transfer switches 103 is turned off. It should be noted that it is necessary to turn off the reset switches 107 in advance of the transfer operation. In this embodiment, the transfer switches 103 are turned off simultaneously at time t52. Accordingly, charge accumulation time is from time t52, at which the reset operation ends, to time t55, at which transfer ends.

The transfer operation for line n+1 is performed at a timing from t55 onward. Operation is executed successively thereafter and the transfer operation for all lines is completed at time t57. The read-out operation for outputting an image signal from the image sensing device will be described next. By applying the pulse φSEL to turn on the selection switches 106 following the end of the transfer operation for the nth line, electric charge held in the floating diffusion areas 104 is converted to voltage and the voltage is output to the read-out circuit 113. Signals held temporarily by the read-out circuit 113 are output successively by the vertical scanning circuit 112 at time t56. Read-out of the (n+1)th line is performed from time t58 onward, this being the time at which output of line n ends.

In FIG. 1, times t53 and t54 can be reversed in terms of their relationship. That is, it may be so arranged that the transfer operation is performed successively from a line at which the reset operation has been completed, without waiting for the end of the reset operations for all lines. In this case, an even higher shutter speed can be achieved.

In accordance with the method of drive described above, the length of time from the start of scanning of a certain line to the start of scanning of the next line can be decided independently of the read-out operation. As a result, a high-speed rolling electronic shutter operation can be achieved and it becomes possible to reduce image distortion, which is caused by different accumulation times in one screen.

Figure 2:
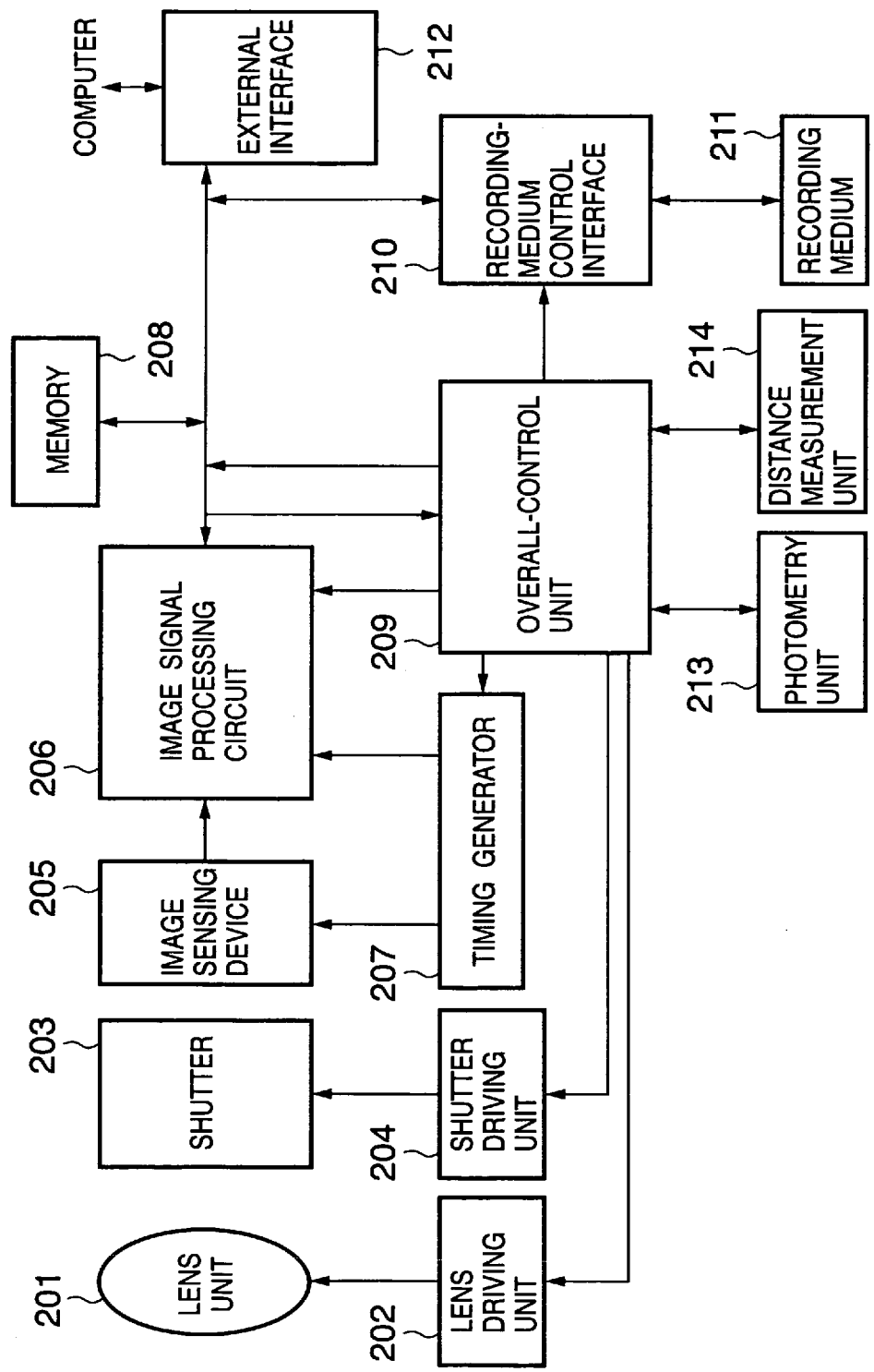
FIG. 2 is a block diagram illustrating the structure of an image sensing apparatus according to the embodiment of the invention.

Reference will now be had to FIG. 2 to describe in detail an example of a case where a method of driving an image sensing device according to the embodiment set forth above is applied to a digital camera serving as an image sensing apparatus.

As shown in FIG. 2, the image sensing apparatus includes a lens unit 201 for forming the image of a subject on an image sensing device 205. The lens unit 201 is driven and controlled in terms of zoom, focus and f-stop by a lens driving unit 202. A shutter 203, which serves as a light-shield member, comprises a shutter mechanism having only a curtain corresponding to a rear curtain of a focal-plane-type shutter used in a so-called single-lens reflex camera. The shutter 203 is driven and controlled by a shutter driving unit 204. The image sensing device 205, which has the structure illustrated in FIG. 6, is for capturing the subject, whose image has been formed by the lens unit 201, as an image signal. An image signal processing circuit 206 applies various processing to the image signal that is output from the image sensing device 205. The image signal processing circuit 206 executes amplification of the image signal, A/D conversion for converting the analog image signal to a digital signal, various corrections applied to the image data obtained by the A/D conversion, and compression of the image data, etc.

The image sensing apparatus further includes a timing generator 207 for outputting various timing signals to the image sensing device 205 and the image signal processing circuit 206; an overall-control unit 209 for performing overall control of the image sensing apparatus and for performing various arithmetic operations; a memory 208 for temporarily storing image data; and a recording-medium control interface 210 for recording image data or reading image data out of a recording medium 211. The recording medium 211, which is a removable recording medium, is a semiconductor memory or the like for recording or reading out image data. The apparatus further includes an external interface 212 for performing communication with an external computer or the like; a photometry unit 213 for detecting brightness of the subject; and a distance measurement unit 214 for detecting distance to the subject.

Operation when the digital camera having the above-described structure takes a picture will now be set forth.

When a main power supply is turned on, the power sources of various control channels turn on and so does the power source of the image sensing circuitry such as the image signal processing circuit 206. When a release button (not shown) is pressed, the overall-control unit 209 performs photometry using the photometry unit 213, judges the brightness of the subject and, using the lens driving unit 202, controls the f-stop of the lens unit 201 in accordance with the result of photometry in order to control the amount of exposure. Next, on the basis of the signal that is output from the distance measurement unit 214, the overall-control unit 209 extracts high-frequency components and determines whether the image of the subject is in focus. When the overall-control unit 209 judges that the image is not in focus, it drives the lens unit 201 by the lens driving unit 202 and again determines whether the image is in focus. This operation is repeated. The image sensing operation is started after it is determined that the image is in focus.

Figure 3:
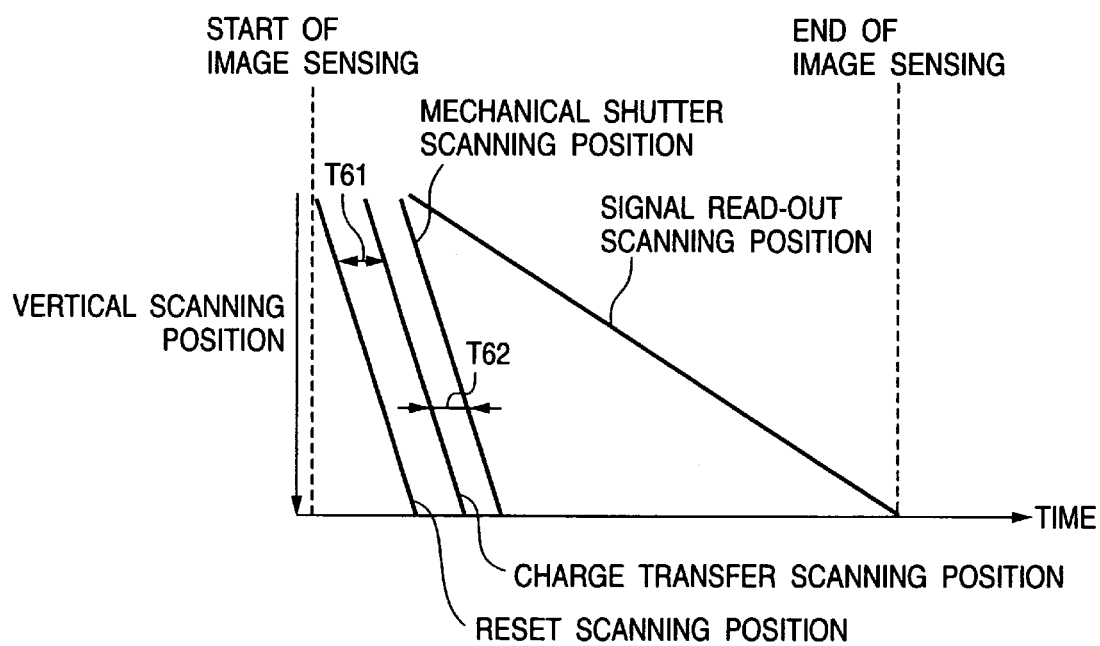
FIG. 3 is a diagram conceptually illustrating drive timing according to the embodiment of the present invention.

Next, reference will be had to FIG. 3 to describe a sequence for controlling drive of the image sensing device and shutter in the digital camera when an image is sensed.

Resetting of the image sensing device is started first. Scanning in the resetting operation is performed sequentially along the line direction of the image sensing device. Thereafter, transfer operation is started after a predetermined charge accumulation period T61. Scanning in the transfer operation is performed sequentially along the line direction of the image sensing device. Scanning in the resetting operation and scanning the transfer operation take place in the same direction and the scanning speeds also are the same. The charge accumulation time, therefore, is the same T61 on any line. This is followed by the start of the read-out operation. In order to prevent the image sensing device from being exposed to light during read-out, the mechanical shutter 203 is caused to scan. The shutter 203 is not provided in order to decide charge accumulation time; accumulation time is decided by the timing at which the image sensing device is driven, namely by the resetting and transfer operations of the image sensing device. Since the electronic shutter is such that the resetting and transfer operations are carried out by the image sensing device, time T61 does not differ along the vertical direction of the image sensing device and highly precise exposure-time control becomes possible. Further, since the shutter 203 is used in order to shield the image sensing device 205 from light after charge transfer, the shutter can be made the single-blade type having only the rear curtain, although the shutter may be of the so-called two-blade type having front and rear curtains employed in ordinary single-lens reflex cameras. With a shutter of the single-blade type, it is possible to reduce the thickness of the shutter unit in comparison with a focal-plane shutter of the two-blade-type used in the prior art. This is advantageous in terms of space.

Further, by making the scanning direction of the shutter 203 the same as the reset or transfer scanning direction of the image sensing device 205, it is possible to reduce the difference in period T62 at each line exposed after the end of the transfer operation. Furthermore, since there is a disparity in scanning time when the mechanical shutter scans across the image sensing device 205, the scanning time of the mechanical shutter and the scanning time of the image sensing device 205 are made approximately the same, thereby making it possible to reduce the difference.

When the picture-taking operation ends, the image signal that has been output from the image sensing device 205 is subjected to processing such as amplification and A/D conversion by the image signal processing circuit 206 and the processed signal is written to the memory 208 by the overall-control unit 209.

The image data that has accumulated in the memory 208 is thenceforth recorded on the removable recording medium 211, such as a semiconductor memory, via the recording-medium control interface 210 under the control of the overall-control unit 209. Further, the image data may be subjected to image manipulation by inputting it to an external computer or the like via the external interface 212.

In a case where the amount of incident light on the image sensing device of FIG. 6 is large, i.e., if the amount of incident light is such that the photodiode saturates during the period T62, there is a possibility that the charge produced by the photodiode will overflow and leak into the floating diffusion area. However, it is possible to prevent this using an image sensing device having a function that sweeps away excess electric charge, namely an overflow-drain function, as disclosed in the specification of Japanese Patent Application Laid-Open No. 2000-260971.

Figure 4:
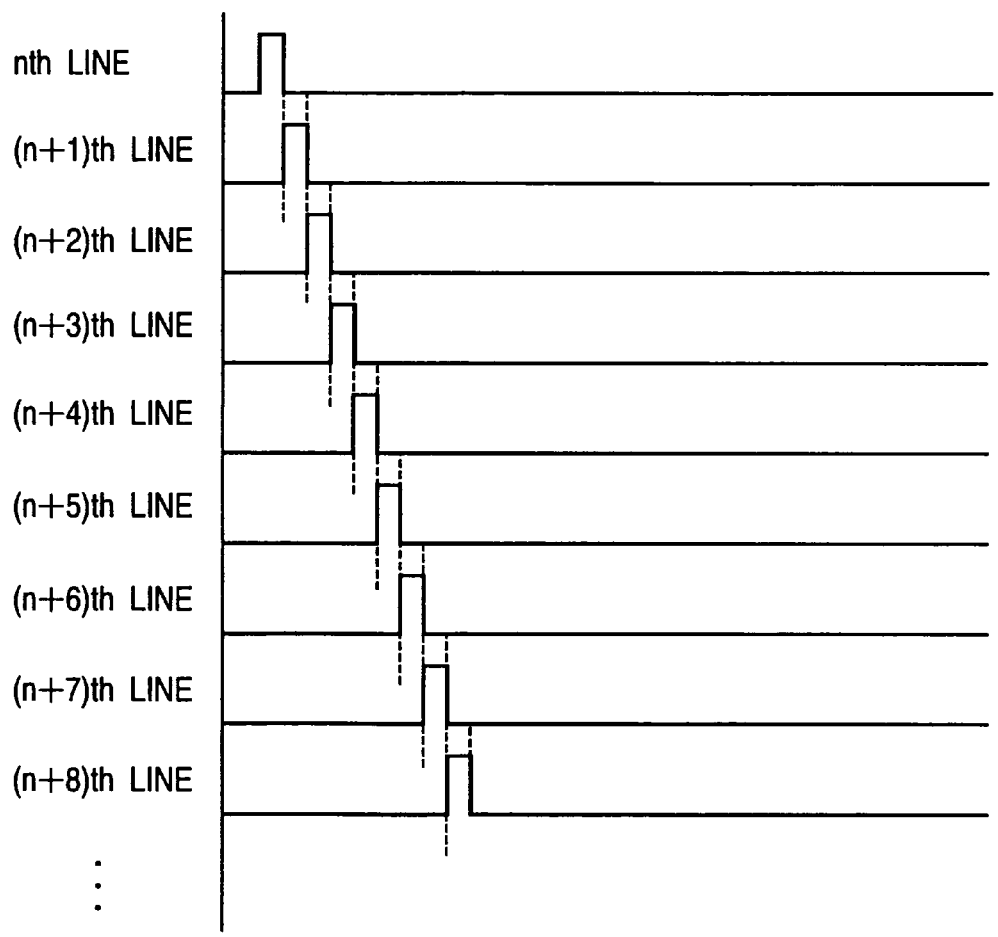
FIG. 4 is a timing chart illustrating an example of scan timing of a vertical scanning circuit according to the embodiment of the present invention.
Figure 5:
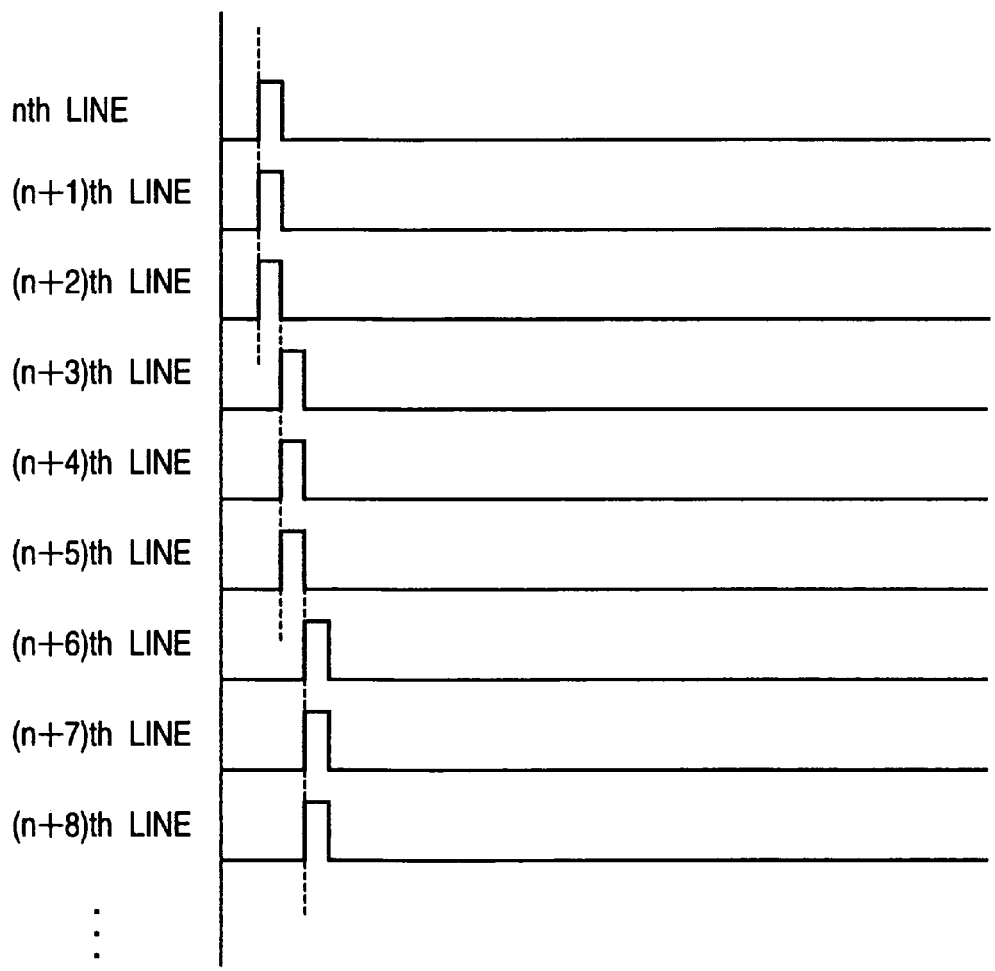
FIG. 5 is a timing chart illustrating another example of scan timing of a vertical scanning circuit according to the embodiment of the present invention.

Further, with the image sensing device described above, the vertical scanning circuit employs a scanning circuit that implements a shift one stage at a time, as illustrated in the timing chart of FIG. 4. However, by using a scanning circuit that is capable of performing a scanning operation, as shown in the timing chart of FIG. 4, in block units each consisting of a plurality of lines, an electronic shutter of higher speed and little distortion can be realized.

Further, it may be so arranged that read-out of the image signal is started from the pixels of the first line after the electric charge of all lines has been transferred to the floating diffusion area.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-415481, filed on Dec. 12, 2003, which is hereby incorporated by reference herein.

What is claimed is:

1. A method of driving an image sensing apparatus that includes a plurality of two-dimensionally arrayed pixels each having a light-receiving portion for generating and accumulating electric charge in accordance with amount of incident light and a storage portion for temporarily storing a charge signal that has accumulated in the light-receiving portion, and an output unit that outputs the charge signal, which has been transferred to the storage portions, successively pixel by pixel, said method comprising:

a reset step of resetting the light-receiving portions and storage portions successively by prescribed unit of pixels;

a transfer step of transferring the charge signal, which has accumulated in the light-receiving portions, to the storage portions successively by the prescribed unit of pixels after said reset step; and a read-out step of reading out the charge signal, which has been transferred to the storage portions, via the output unit successively by the prescribed unit of pixels, wherein the transfer step of a second line of pixels begins while the read-out step of a first line of pixels adjacent to the second line of pixels is being performed.

2. The method according to claim 1, further comprising a shielding step of blocking light, which is incident upon the image sensing apparatus, by driving a mechanical shutter in a resetting direction of said reset step after lapse of a prescribed period of time from start of said reset step and start of said transfer step, wherein the prescribed time interval is a time interval in which the time it takes to transfer all charge signals that have accumulated in the light-receiving portions in said transfer step and the time it takes to achieve complete shielding from start of shielding by the mechanical shutter become approximately the same.

3. The method according to claim 1, wherein the prescribed unit of pixels is one row or one column of the plurality of pixels.

4. The method according to claim 1, wherein the prescribed unit of pixels is a plurality of rows or a plurality of columns of the plurality of pixels.

5. An image sensing apparatus comprising:
a plurality of two-dimensionally arrayed pixels each having a light-receiving portion for generating and accumulating electric charge in accordance with amount of incident light and a storage portion for temporarily storing a charge signal that has accumulated in the light-receiving portion;
an output unit that outputs the charge signal, which has been transferred to the storage portion, successively pixel by pixel; and
a scanning unit which operates in a reset mode for resetting the light-receiving portions and storage portions successively by prescribed unit of pixels, a transfer mode for transferring the charge signal, which has accumulated in the light-receiving portions, to the storage portions successively by the prescribed unit of pixels after resetting the light-receiving portions and storage portions, and a read-out mode for reading out the charge signal, which has been transferred to the storage portions, via said output unit successively by the prescribed unit of pixels,
wherein said scanning unit is configured in such a way that the transfer mode of a second line of pixels begins while the read-out mode of a first line of pixels adjacent to the second line of pixels is being performed.

6. The apparatus according to claim 5, wherein the prescribed unit of pixels is one row or one column of the plurality of pixels.

7. The apparatus according to claim 5, wherein the prescribed unit of pixels is a plurality of rows or a plurality of columns of the plurality of pixels.

8. The apparatus according to claim 5, further comprising:
a mechanical shutter, which is driven in a resetting direction, that blocks light incident upon the plurality of pixels; and
a driving unit that drives said mechanical shutter after lapse of a prescribed period of time from start of reset and start of transfer of charge signals from the light-receiving portions to the storage portions,
wherein the prescribed time interval is a time interval in which the time it takes to transfer all charge signals that have accumulated in the light-receiving portions in said transfer mode and the time it takes to achieve complete shielding from start of shielding by said mechanical shutter become approximately the same.

9. A method of driving an image sensing apparatus that includes a plurality of two-dimensionally arrayed pixels each having a light-receiving portion for generating and accumulating electric charge in accordance with amount of incident light and a storage portion for temporarily storing a charge signal that has accumulated in the light-receiving portion, an read-out circuit for storing the charge signal output from the pixels, and an output unit that outputs the charge signal from the read-out circuit, said method comprising:
a reset step of resetting the light-receiving portions and storage portions successively by prescribed unit of pixels;
a transfer step of transferring the charge signal, which has accumulated in the light-receiving portions, to the storage portions successively by the prescribed unit of pixels after said reset step; and
a read-out step of transferring the charge signal, which has been transferred to the storage portions, to the read-out circuit successively by the prescribed unit of pixels, and outputting the charge signal from the read-out circuit via the output unit pixel by pixel,
wherein, after the charge signal of a first line of pixels is transferred in said transfer step, said transfer step of a second line of pixels adjacent to the first line of pixels is performed while said read-out step of the first line of pixels is being performed.

10. An image sensing apparatus comprising:
a plurality of two-dimensionally arrayed pixels each having a light-receiving portion for generating and accumulating electric charge in accordance with amount of incident light and a storage portion for temporarily storing a charge signal that has accumulated in the light-receiving portion;
an read-out circuit for storing the charge signal output from the pixels;
an output unit that outputs the charge signal from the read-out circuit; and
a scanning unit which operates in a reset mode for resetting the light-receiving portions and storage portions successively by a prescribed unit of pixels, a transfer mode for transferring the charge signal, which has accumulated in the light-receiving portions, to the storage portions successively by the prescribed unit of pixels after resetting the light-receiving portions and storage portions, a read-out mode for transferring the charge signal, which has been transferred to the storage portions, to the read-out circuit successively by the prescribed unit of pixels, and outputting the charge signal from the read-out circuit via the output unit pixel by pixel;
wherein said scanning unit is configured in such a way that, after the charge signal of a first line of pixels is transferred in the transfer mode, said scanning unit operates in the transfer mode for a second line of pixels adjacent to the first line of pixels while the charge signal of the first line of pixels is being transferred to the read-out circuit in the read-out mode.

* * * * *